US012776740B2

(12) United States Patent
Chen et al.

(10) Patent No.: US 12,776,740 B2
(45) Date of Patent: Oct. 27, 2026

(54) MOTOR ROTATIONAL SPEED LIMIT CIRCUIT

(71) Applicant: ANPEC ELECTRONICS CORPORATION, Hsinchu (TW)

(72) Inventors: Li-Wei Chen, Hsinchu City (TW); Ke-Tsung Chen, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 308 days.

(21) Appl. No.: 18/659,011

(22) Filed: May 9, 2024

(65) Prior Publication Data

US 2025/0253798 A1 Aug. 7, 2025

(30) Foreign Application Priority Data

Feb. 5, 2024 (TW) ................................ 113104325

(51) Int. Cl.
*H02P 29/10* (2016.01)
*H02P 29/032* (2016.01)

(52) U.S. Cl.
CPC ............ *H02P 29/10* (2016.02); *H02P 29/032* (2016.02)

(58) Field of Classification Search
CPC ........ H02P 29/032; H02P 29/10; H02P 6/181; H02P 2205/07
See application file for complete search history.

(56) References Cited

U.S. PATENT DOCUMENTS

| | | | | |
|---|---|---|---|---|
| 5,105,130 A * | 4/1992 | Barker | B25F 5/00 318/268 |
| 11,205,999 B2 * | 12/2021 | Wen | H03F 3/183 |
| 11,213,933 B2 * | 1/2022 | Kato | H02P 29/20 |
| 12,053,855 B2 * | 8/2024 | Kelly | B23Q 17/10 |
| 2018/0248507 A1 * | 8/2018 | Vanko | H02P 29/50 |
| 2019/0201047 A1 * | 7/2019 | Yates | H04N 7/183 |
| 2021/0008688 A1 * | 1/2021 | Kelly | B24B 49/10 |
| 2021/0119589 A1 * | 4/2021 | Wen | H03F 3/183 |
| 2022/0193871 A1 * | 6/2022 | Friedman | B25F 5/00 |

FOREIGN PATENT DOCUMENTS

TW 202226742 A 7/2022

* cited by examiner

*Primary Examiner* — Thai T Dinh
(74) *Attorney, Agent, or Firm* — Li & Cai Intellectual Property Office

(57) ABSTRACT

A motor rotational speed limit circuit is provided. The motor rotational speed limit circuit includes a controller circuit, a detector circuit and a driver circuit. The controller circuit includes an open loop circuit and a closed loop circuit. The open loop circuit outputs an open loop rotational speed control command. The closed loop circuit outputs a closed loop rotational speed control command. The detector circuit detects a rotational speed of a motor. The driver circuit, according to the rotational speed of the motor, selects one of the open loop rotation control command and the closed loop rotation control command to output a driving signal to the motor.

14 Claims, 10 Drawing Sheets

MOTOR ROTATIONAL SPEED LIMIT CIRCUIT

CROSS-REFERENCE TO RELATED PATENT APPLICATION

This application claims the benefit of priority to Taiwan Patent Application No. 113104325, filed on Feb. 5, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor rotational speed limit circuit.

BACKGROUND OF THE DISCLOSURE

In electronic devices, fans are used to cool heat generating components such as processors. When an open loop circuit is used to control a motor of the fan, a rotational speed of the motor of the fan may reach an abnormally high rotational speed due to external environmental factors.

When the rotational speed of the motor of the fan reaches the abnormally high rotational speed, the open loop circuit is removed from a system circuit and a closed loop circuit is added into the system circuit for reducing the rotational speed of the motor for preventing the fan and the system circuit from being damaged by a power effect and a back electromotive force effect. As a result, cost required for the adjustment of the system circuit is increased. In addition, the control of the rotational speed of the motor is limited. That is, control commands outputted by the closed loop circuit, for controlling the rotational speed of the motor to reach different target rotational speeds that respectively fall within full frequency ranges, is limited by regulations.

SUMMARY OF THE DISCLOSURE

In response to the above-referenced technical inadequacies, the present disclosure provides a motor rotational speed limit circuit. The motor rotational speed limit circuit includes a controller circuit, a detector circuit and a driver circuit. The controller circuit includes an open loop circuit and a closed loop circuit. The open loop circuit is configured to output an open loop rotational speed control command. The closed loop circuit is configured to output a closed loop rotational speed control command. The detector circuit is connected to a motor. The detector circuit is configured to detect a rotational speed of the motor. The driver circuit is connected to the open loop circuit and the closed loop circuit of the controller circuit. The driver circuit is connected to the detector circuit and the motor. The driver circuit, according to the rotational speed of the motor that is detected by the detector circuit, selects one of the open loop rotational speed control command of the open loop circuit and the closed loop rotational speed control command of the closed loop circuit to output a driving signal to the motor.

As described above, the present disclosure provides the motor rotational speed limit circuit. Under normal conditions, the open loop circuit included in the motor rotational speed limit circuit of the present disclosure is used to control the motor (of a fan). However, when the rotational speed of the motor detected by the detector circuit of the motor rotational speed limit circuit of the present disclosure exceeds the rotational speed limit value or the rotational speed threshold, the open loop circuit included in the motor rotational speed limit circuit of the present disclosure is used to control the motor for reducing the rotational speed of the motor. When the rotational speed of the motor is reduced to be lower than the rotational speed limit value or the rotational speed threshold, the closed loop circuit included in the motor rotational speed limit circuit of the present disclosure is used to control the motor in order to protect the motor (of the fan) and the motor rotational speed limit circuit of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
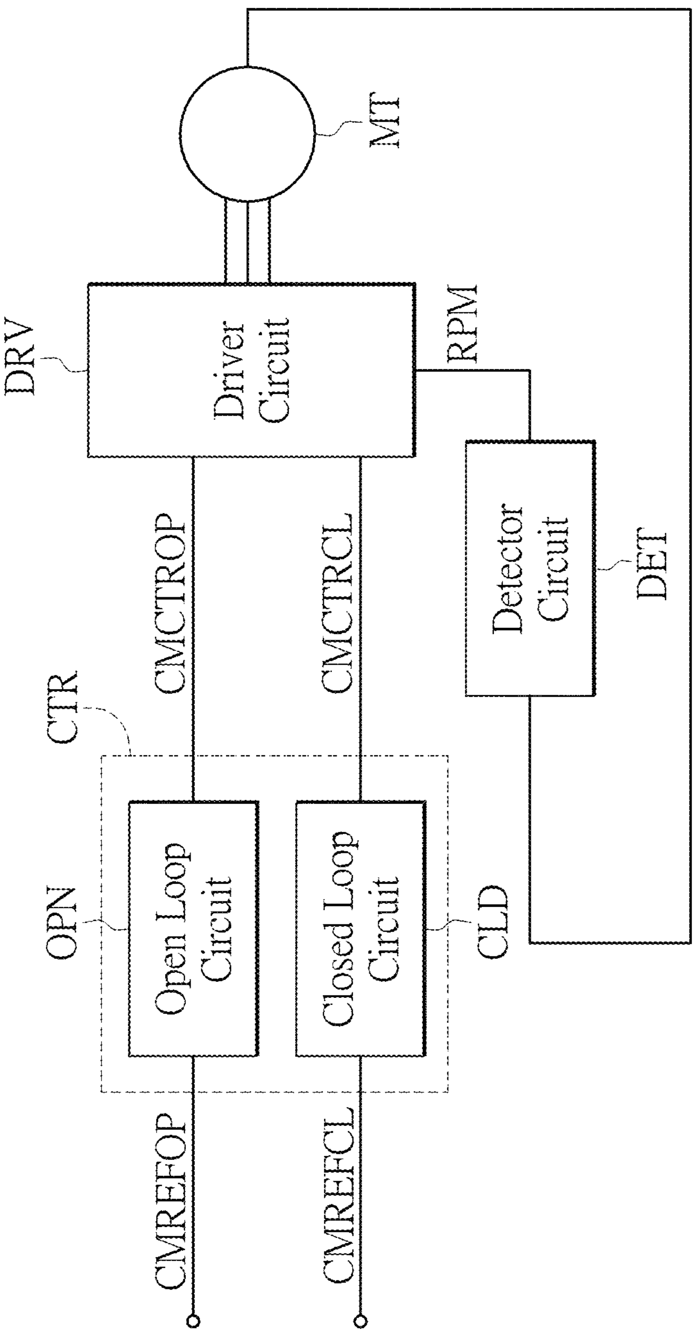
FIG. 1 is a block diagram of a motor rotational speed limit circuit according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a motor rotational speed limit circuit according to a first embodiment of the present disclosure. In the first embodiment, the motor rotational speed limit circuit of the present disclosure includes a controller circuit CTR, a detector circuit DET and a driver circuit DRV.

The controller circuit CTR of the motor rotational speed limit circuit of the present disclosure includes an open loop circuit OPN and a closed loop circuit CLD.

The driver circuit DRV is connected to the open loop circuit OPN and the closed loop circuit CLD of the controller circuit CTR. The driver circuit DRV is connected to the detector circuit DET and a motor MT. The detector circuit DET is connected to the motor MT. The motor MT described herein is a single-phase motor or a three-phase motor.

The open loop circuit OPN of the controller circuit CTR outputs an open loop rotational speed control command CMCTROP. If necessary, the open loop circuit OPN outputs the open loop rotational speed control command CMCTROP according to an open loop reference rotational command CMREFOP from an external instruction circuit.

The closed loop circuit CLD of the controller circuit CTR outputs a closed loop rotational speed control command CMCTRCL. If necessary, the open loop circuit OPN outputs the closed loop rotational speed control command CMCTRCL according to a closed loop reference rotational command CMREFCL from the external instruction circuit.

The detector circuit DET detects a rotational speed RPM of the motor MT.

The driver circuit DRV, according to the rotational speed RPM of the motor MT that is detected by the detector circuit DET, selects one of the open loop rotational speed control command CMCTROP of the open loop circuit OPN and the closed loop rotational speed control command CMCTRCL of the closed loop circuit CLD.

The driver circuit DRV, according to the one of the open loop rotational speed control command CMCTROP and the closed loop rotational speed control command CMCTRCL, outputs a driving signal to the motor MT for driving the motor MT.

Figure 2:
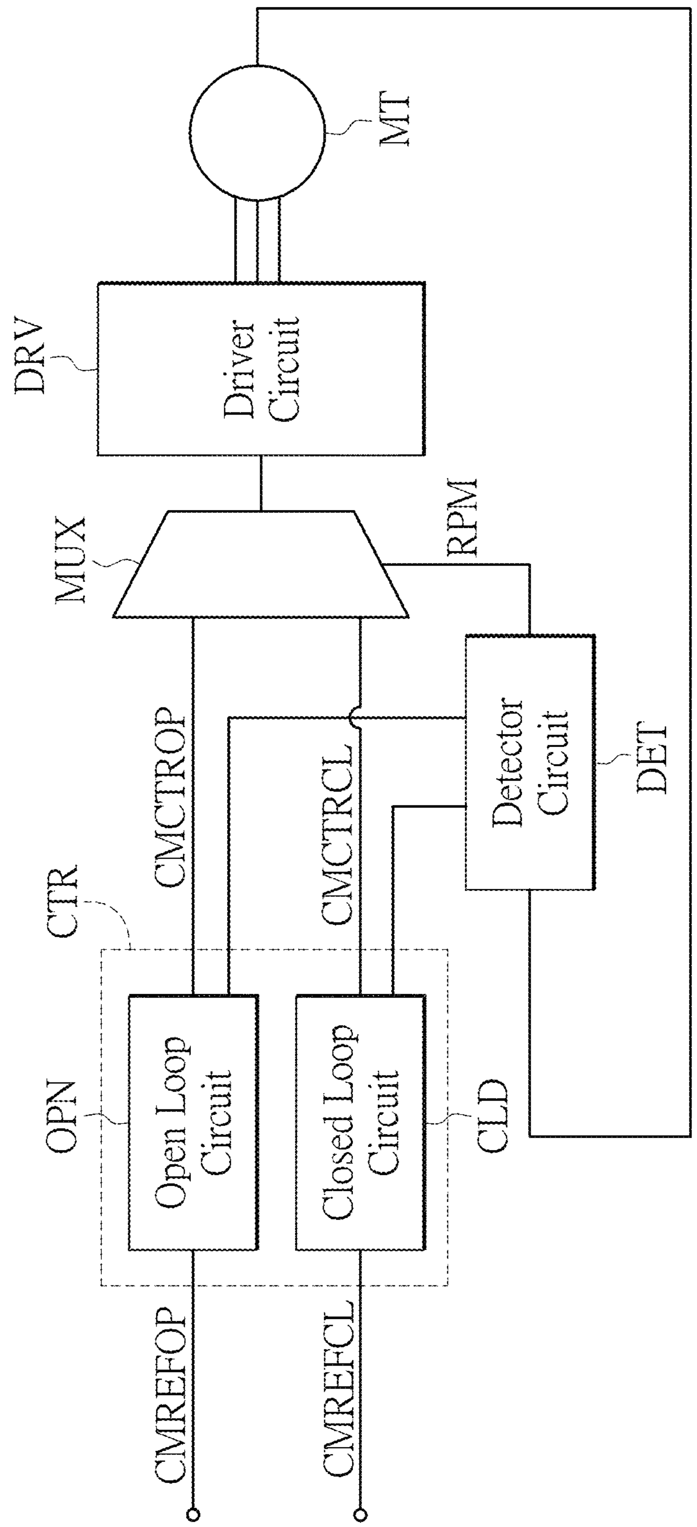
FIG. 2 is a block diagram of a motor rotational speed limit circuit according to a second embodiment of the present disclosure.

Reference is made to FIG. 2, which is a block diagram of a motor rotational speed limit circuit according to a second embodiment of the present disclosure.

In the second embodiment, the motor rotational speed limit circuit of the present disclosure not only includes the controller circuit CTR, the detector circuit DET and the driver circuit DRV, but also includes a selector circuit such as, but not limited to, a multiplexer MUX as shown in FIG. 2. The controller circuit CTR includes the open loop circuit OPN and the closed loop circuit CLD. The descriptions of the second embodiment of the present disclosure that are the same as that of the first embodiment of the present disclosure are not repeated herein.

A first input terminal of the multiplexer MUX is connected to an output terminal of the open loop circuit OPN of the controller circuit CTR. A second input terminal of the multiplexer MUX is connected to an output terminal of the closed loop circuit CLD of the controller circuit CTR. A control terminal of the multiplexer MUX is connected to an output terminal of the detector circuit DET. An output terminal of the multiplexer MUX is connected to an input terminal of the driver circuit DRV. An output terminal of the driver circuit DRV and an input terminal of the detector circuit DET are connected to the motor MT.

The selector circuit (including the multiplexer MUX), according to the rotational speed RPM of the motor MT that is detected by the detector circuit DET, selects one of the open loop rotational speed control command CMCTROP of the open loop circuit OPN and the closed loop rotational speed control command CMCTRCL of the closed loop circuit CLD. The selector circuit (including the multiplexer MUX) outputs the one of the open loop rotational speed control command CMCTROP and the closed loop rotational speed control command CMCTRCL to the driver circuit DRV.

The driver circuit DRV, according to the one of the open loop rotational speed control command CMCTROP and the closed loop rotational speed control command CMCTRCL, outputs the driving signal to the motor MT for driving the motor MT.

Figure 3:
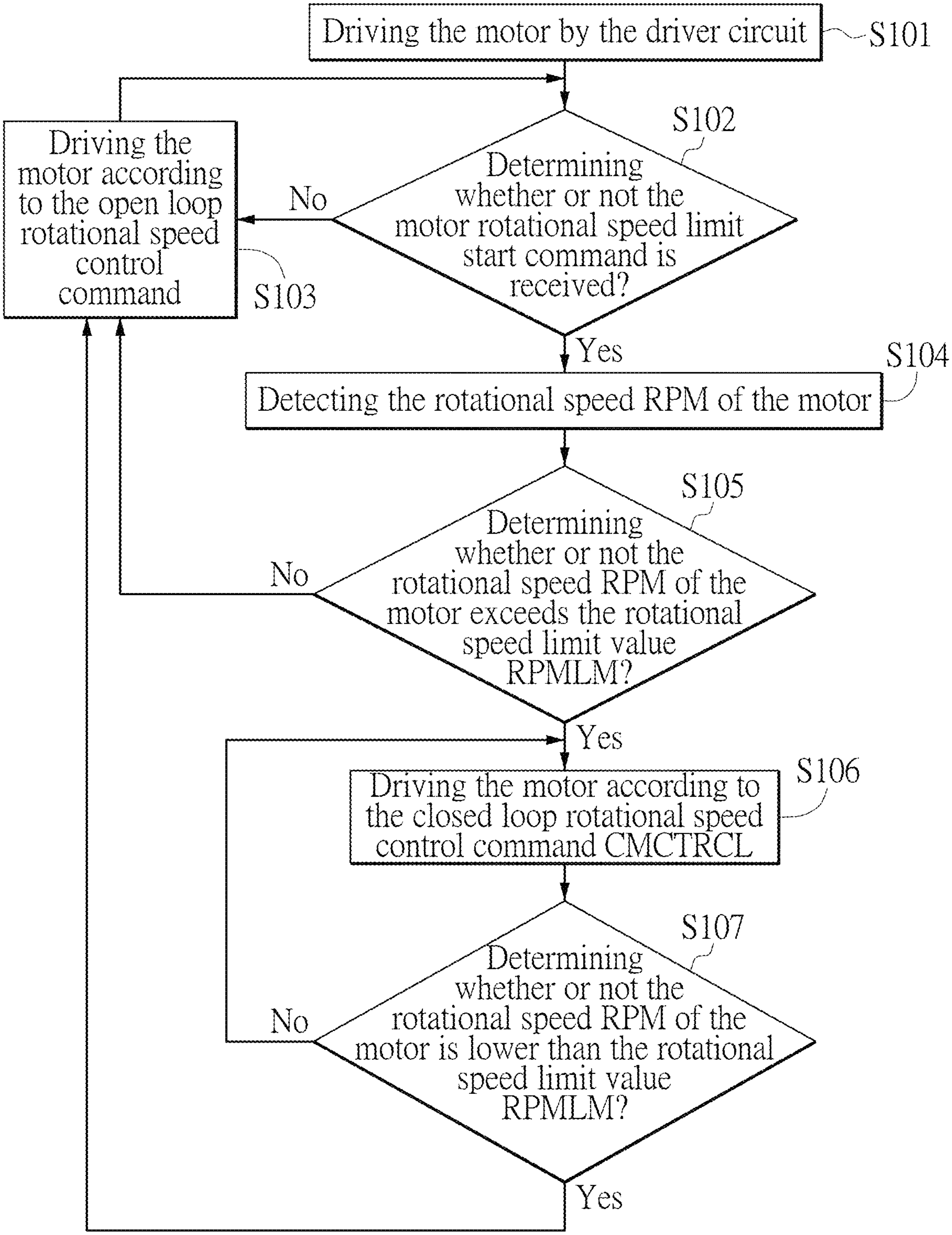
FIG. 3 is a flowchart diagram of steps performed by a motor rotational speed limit circuit according to a third embodiment of the present disclosure.

Reference is made to FIG. 3, which is a flowchart diagram of steps performed by a motor rotational speed limit circuit according to a third embodiment of the present disclosure.

The motor rotational speed limit circuit of the present disclosure as shown in FIG. 1 or FIG. 2 may perform operations of steps S101 to S107 as shown in FIG. 3, which are described in detail as follows.

In step S101, the driver circuit DRV drives the motor MT.

In step S102, the detector circuit DET determines whether or not the detector circuit DET receives a motor rotational speed limit start command from the external instruction circuit.

If the detector circuit DET does not receive the motor rotational speed limit start command from the external instruction circuit, step S103 is then performed. Conversely, if the detector circuit DET receives the motor rotational speed limit start command from the external instruction circuit, step S104 and step S105 are sequentially performed.

In step S103, the motor rotational speed limit circuit of the present disclosure enters an open loop control mode or continually operates in the open loop control mode. In the open loop control mode, the driver circuit DRV of the motor rotational speed limit circuit of the present disclosure outputs the driving signal to the motor MT for controlling the motor MT according to the open loop rotational speed control command CMCTROP outputted by the open loop circuit OPN.

In step S104, the detector circuit DET detects the rotational speed RPM of the motor MT.

In step S105, the driver circuit DRV as shown in FIG. 1 or the multiplexer MUX as shown in FIG. 2 determines whether or not the rotational speed RPM of the motor MT that is detected before the motor rotational speed limit circuit of the present disclosure enters the closed loop control mode (or when the motor rotational speed limit circuit operates in the open loop control mode) exceeds the rotational speed limit value RPMLM.

If the rotational speed RPM of the motor MT that is detected before the motor rotational speed limit circuit of the present disclosure enters the closed loop control mode (or when the motor rotational speed limit circuit operates in the open loop control mode) does not exceed the rotational speed limit value RPMLM, step S103 is performed.

Conversely, if the rotational speed RPM of the motor MT that is detected before the motor rotational speed limit circuit of the present disclosure enters the closed loop control mode (or when the motor rotational speed limit circuit operates in the open loop control mode) exceeds the rotational speed limit value RPMLM, step 106 and step S107 are sequentially performed.

In step S106, the motor rotational speed limit circuit of the present disclosure enters the closed loop control mode, or switches from the open loop control mode to the closed loop control mode. In the closed loop control mode, the driver circuit DRV of the motor rotational speed limit circuit of the present disclosure, according to the closed loop rotational speed control command CMCTRCL outputted by the closed loop circuit CLD, outputs the driving signal to the motor MT for reducing the rotational speed RPM of the motor MT.

In step S107, the driver circuit DRV as shown in FIG. 1 or the multiplexer MUX as shown in FIG. 2 determines whether or not the rotational speed RPM of the motor MT that is detected by the detector circuit DET in the closed loop control mode is lower than the rotational speed limit value RPMLM.

If the rotational speed RPM of the motor MT that is detected by the detector circuit DET in the closed loop control mode is not reduced to be lower than the rotational speed limit value RPMLM, step S106 is performed such that the motor rotational speed limit circuit of the present disclosure continually operates in the closed loop control mode.

Conversely, if the rotational speed RPM of the motor MT that is detected by the detector circuit DET in the closed loop control mode is lower than the rotational speed limit value RPMLM, step S103 is performed such that the motor rotational speed limit circuit of the present disclosure continually switches from the open loop control mode to the closed loop control mode.

Figure 4:
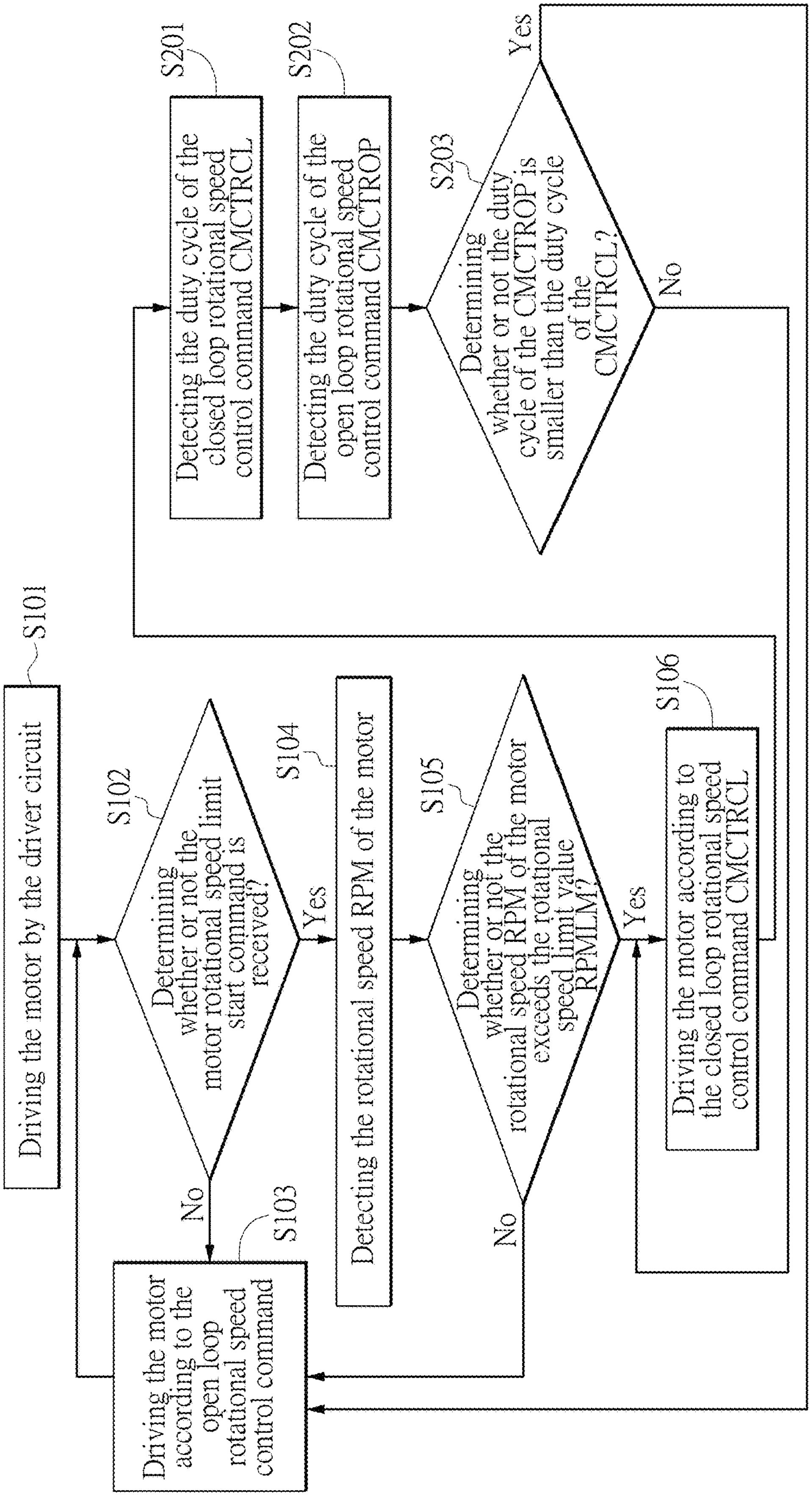
FIG. 4 is a flowchart diagram of steps performed by a motor rotational speed limit circuit according to a fourth embodiment of the present disclosure.

Reference is made to FIG. 4, which is a flowchart diagram of steps performed by a motor rotational speed limit circuit according to a fourth embodiment of the present disclosure. The motor rotational speed limit circuit of the present disclosure as shown in FIG. 1 or FIG. 2 may perform operations of steps S101 to S106 and steps S201 to S203 as shown in FIG. 4, which are described in detail as follows.

After steps S101 to S106 are performed as described above, steps S201 to S203 may be sequentially performed.

In step S201, the detector circuit DET detects the closed loop rotational speed control command CMCTRCL outputted by the closed loop circuit CLD in the closed loop control mode.

In step S202, the detector circuit DET detects the open loop reference rotational command CMREFOP received from the external instruction circuit by the open loop circuit OPN.

In step S203, the driver circuit DRV as shown in FIG. 1 or the multiplexer MUX as shown in FIG. 2 determines whether or not the duty cycle of the open loop reference rotational command CMREFOP received from the external instruction circuit by the open loop circuit OPN is smaller than the duty cycle of the closed loop rotational speed control command CMCTRCL outputted by the closed loop circuit CLD.

If the duty cycle of the open loop reference rotational command CMREFOP received from the external instruction circuit by the open loop circuit OPN is not smaller than the duty cycle of the closed loop rotational speed control command CMCTRCL outputted by the closed loop circuit CLD, step S106 is performed such that the motor rotational speed limit circuit of the present disclosure still operates in the closed loop control mode.

If the duty cycle of the open loop reference rotational command CMREFOP received from the external instruction circuit by the open loop circuit OPN is smaller than the duty cycle of the closed loop rotational speed control command CMCTRCL outputted by the closed loop circuit CLD, step S103 is performed such that the motor rotational speed limit circuit of the present disclosure switches from the closed loop control mode to the open loop control mode.

Figure 5:
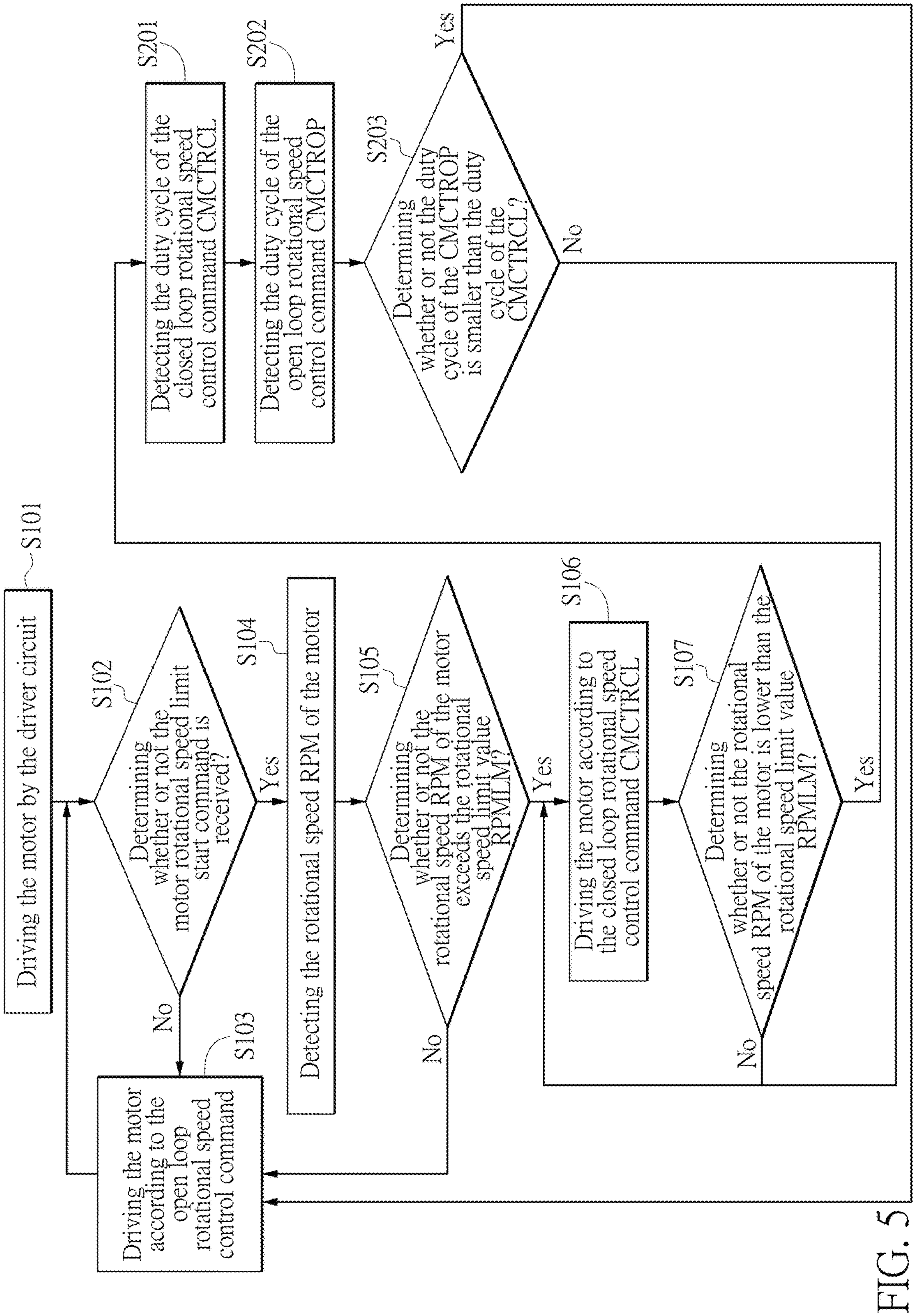
FIG. 5 is a flowchart diagram of steps performed by a motor rotational speed limit circuit according to a fifth embodiment of the present disclosure.

Reference is made to FIG. 5, which is a flowchart diagram of steps performed by a motor rotational speed limit circuit according to a fifth embodiment of the present disclosure.

In the fifth embodiment, the motor rotational speed limit circuit of the present disclosure as shown in FIG. 1 or FIG. 2 may not only perform the operations of steps S101 to S107 as shown in FIG. 5, but also perform the operations of steps S201 to S203 as shown in FIG. 5. The steps S101 to S107 and the steps S201 to S203 are described above.

It is worth noting that, in the fifth embodiment, when the rotational speed RPM of the motor MT in the closed loop control mode is lower than the rotational speed limit value RPMLM (step S107) and the duty cycle of the open loop reference rotational command CMREFOP received from the external instruction circuit by the open loop circuit OPN is smaller than the duty cycle of the closed loop rotational speed control command CMCTRCL outputted by the closed loop circuit CLD (step S203), the motor rotational speed limit circuit of the present disclosure switches from the closed loop control mode to the open loop control mode (step S103).

Conversely, when the rotational speed RPM of the motor MT in the closed loop control mode is not lower than the rotational speed limit value RPMLM (step S107) and/or the duty cycle of the open loop reference rotational command CMREFOP received from the external instruction circuit by the open loop circuit OPN is not smaller than the duty cycle of the closed loop rotational speed control command CMCTRCL outputted by the closed loop circuit CLD (step S203), the motor rotational speed limit circuit of the present disclosure enters the closed loop control mode or continually operates in the closed loop control mode (step S106).

Figure 6:
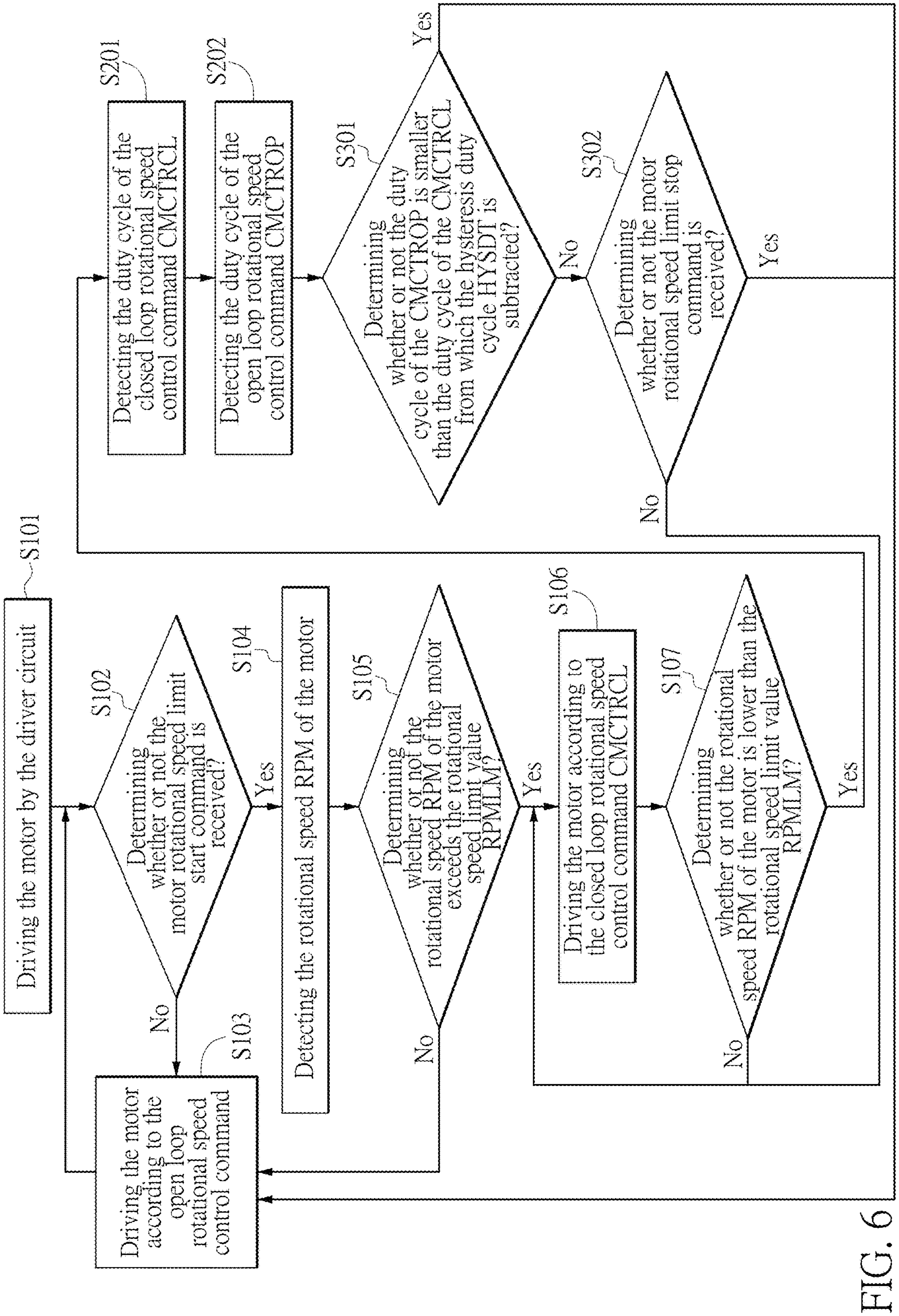
FIG. 6 is a flowchart diagram of steps performed by a motor rotational speed limit circuit according to a sixth embodiment of the present disclosure.
Figure 7:
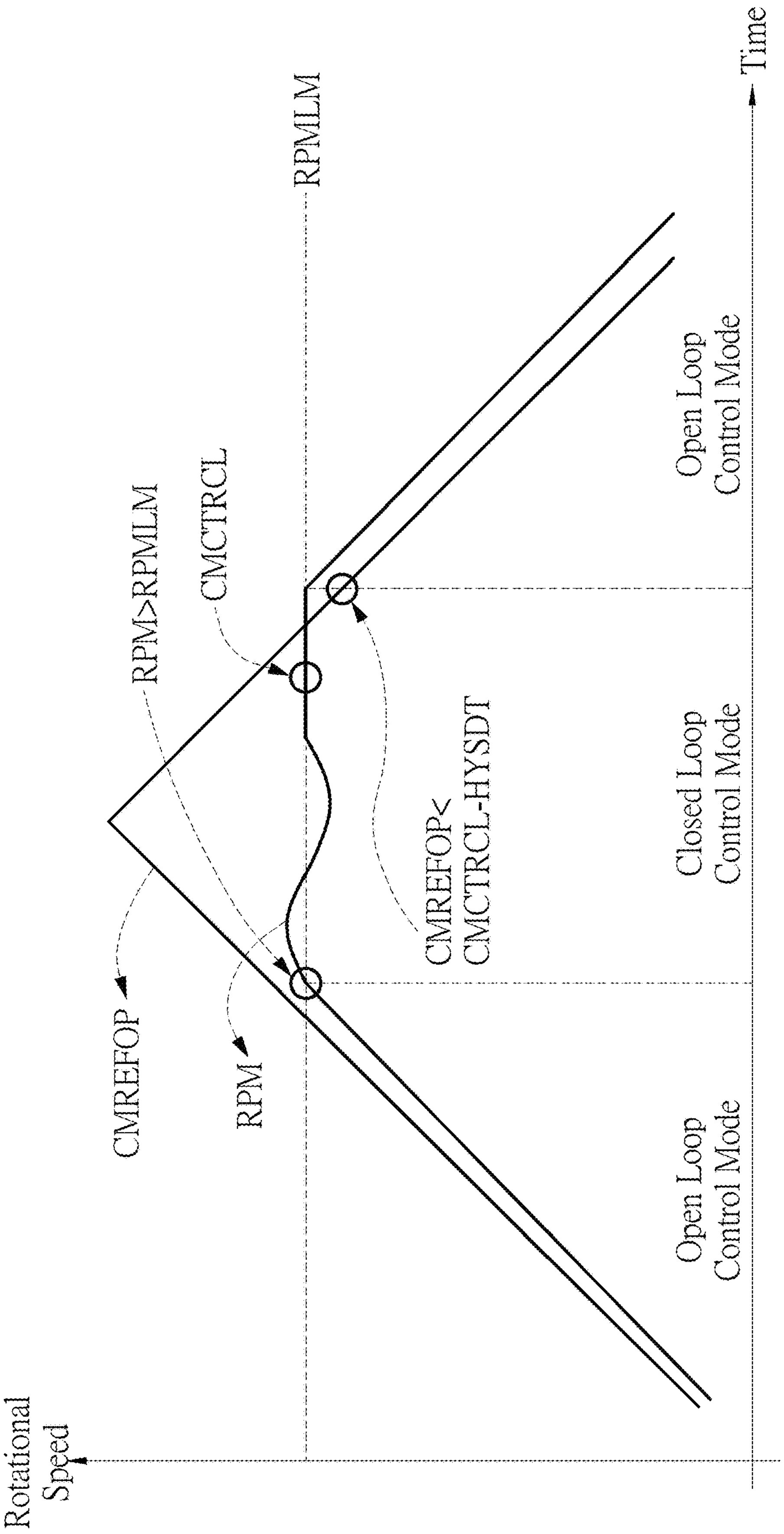
FIG. 7 is a schematic diagram of commands and a limit value of the motor rotational speed limit circuit according to the sixth embodiment of the present disclosure.

Reference is made to FIG. 6 and FIG. 7, in which FIG. 6 is a flowchart diagram of steps performed by a motor rotational speed limit circuit according to a sixth embodiment of the present disclosure, and FIG. 7 is a schematic diagram of commands and a limit value of the motor rotational speed limit circuit according to the sixth embodiment of the present disclosure.

The motor rotational speed limit circuit of the present disclosure as shown in FIG. 1 or FIG. 2 may perform operations of steps S101 to S107, steps S201 to S202, and steps S301 to S302 as shown in FIG. 6, which are described in detail as follows.

It is worth noting that, as shown in FIG. 7, if the rotational speed RPM of the motor MT that is detected by the detector circuit DET in the open loop control mode does not exceed the rotational speed limit value RPMLM (step S105), the motor rotational speed limit circuit of the present disclosure enters the open loop control mode or continually operates in the open loop control mode (step S103).

As shown in FIG. 7, if the rotational speed RPM of the motor MT that is detected by the detector circuit DET in the open loop control mode exceeds the rotational speed limit value RPMLM (step S105), the motor rotational speed limit circuit of the present disclosure switches from the open loop control mode to the closed loop control mode (step S106).

After steps S101 to S107 and steps S201 to S202, steps S301 to S302 are sequentially performed.

In step S301, the driver circuit DRV as shown in FIG. 1 or the multiplexer MUX as shown in FIG. 2 determines whether or not the duty cycle of the open loop reference rotational command CMREFOP received from the external instruction circuit by the open loop circuit OPN in the closed loop control mode is smaller than the duty cycle of the closed loop rotational speed control command CMCTRCL from which a hysteresis duty cycle HYSDT is subtracted.

If the duty cycle of the open loop reference rotational command CMREFOP received from the external instruction circuit by the open loop circuit OPN in the closed loop control mode is not smaller than the duty cycle of the closed loop rotational speed control command CMCTRCL from which the hysteresis duty cycle HYSDT is subtracted, step S302 is then performed (or in practice, step S302 can be omitted and step S106 can then be directly performed) such that the motor rotational speed limit circuit of the present disclosure enters the closed loop control mode or continually operates in the closed loop control mode.

Conversely, if the duty cycle of the open loop reference rotational command CMREFOP received from the external instruction circuit by the open loop circuit OPN in the closed loop control mode is smaller than the duty cycle of the closed loop rotational speed control command CMCTRCL from which the hysteresis duty cycle HYSDT is subtracted, step S103 is performed such that the motor rotational speed limit circuit of the present disclosure switches from the closed loop control mode to the open loop control mode as shown in FIG. 7.

In step S302, the driver circuit DRV determines whether or not the detector circuit DET (or the multiplexer MUX as shown in FIG. 2) in the motor rotational speed limit circuit of the present disclosure receives a motor rotational speed limit stop command from the external instruction circuit.

If the driver circuit DRV determines that the detector circuit DET as shown in FIG. 1 (or the multiplexer MUX as shown in FIG. 2) in the motor rotational speed limit circuit of the present disclosure does not receive the motor rotational speed limit stop command from the external instruction circuit, step S106 is performed such that the motor rotational speed limit circuit of the present disclosure still operates in the closed loop control mode.

Conversely, if the driver circuit DRV determines that the detector circuit DET as shown in FIG. 1 (or the multiplexer MUX as shown in FIG. 2) in the motor rotational speed limit circuit of the present disclosure receives the motor rotational speed limit stop command from the external instruction circuit, step S103 is performed such that the motor rotational speed limit circuit of the present disclosure switches from the closed loop control mode to the open loop control mode.

Figure 8:
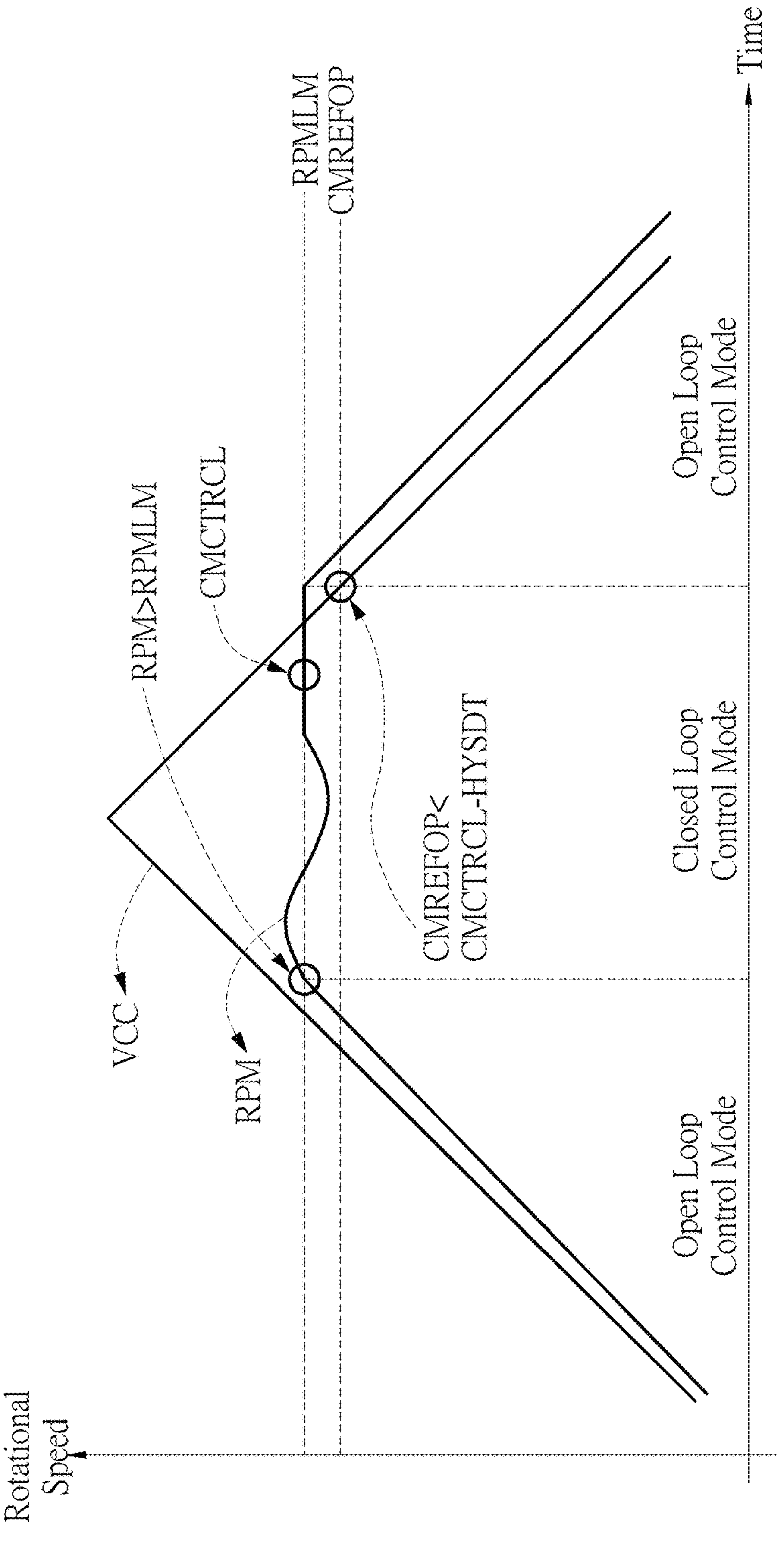
FIG. 8 is a schematic diagram of an common voltage, commands and a limit value of a motor rotational speed limit circuit according to a seventh embodiment of the present disclosure.

Reference is made to FIG. 8, which is a schematic diagram of a common voltage, commands and a limit value of a motor rotational speed limit circuit according to a seventh embodiment of the present disclosure.

The driver circuit DRV of the motor rotational speed limit circuit of the present disclosure as shown in FIG. 1 may be coupled with a common voltage VCC as shown in FIG. 8. For example, the driver circuit DRV of the motor rotational speed limit circuit of the present disclosure includes a plurality of high-side switches each having a first terminal coupled with the common voltage VCC.

In the open loop control mode, the rotational speed of the motor MT increases with increases in the common voltage VCC and the duty cycle of the open loop reference rotational command CMREFOP. When the rotational speed of the motor MT is larger than the rotational speed buffer limit value RPMLMLR in the open loop control mode, the motor rotational speed limit circuit of the present disclosure switches from the open loop control mode to the closed loop control mode.

Figure 9:
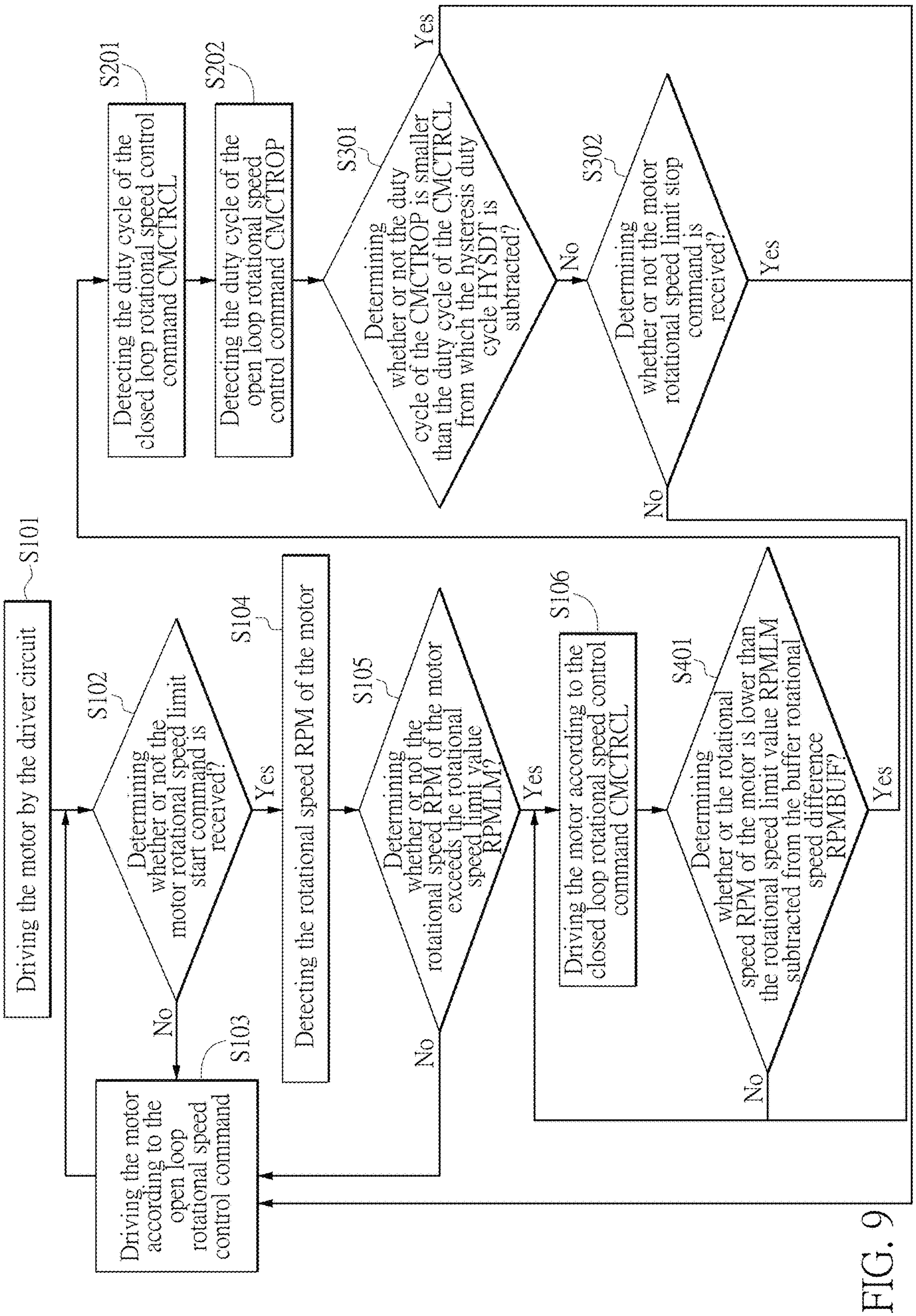
FIG. 9 is a flowchart diagram of steps performed by a motor rotational speed limit circuit according to an eighth embodiment of the present disclosure.
Figure 10:
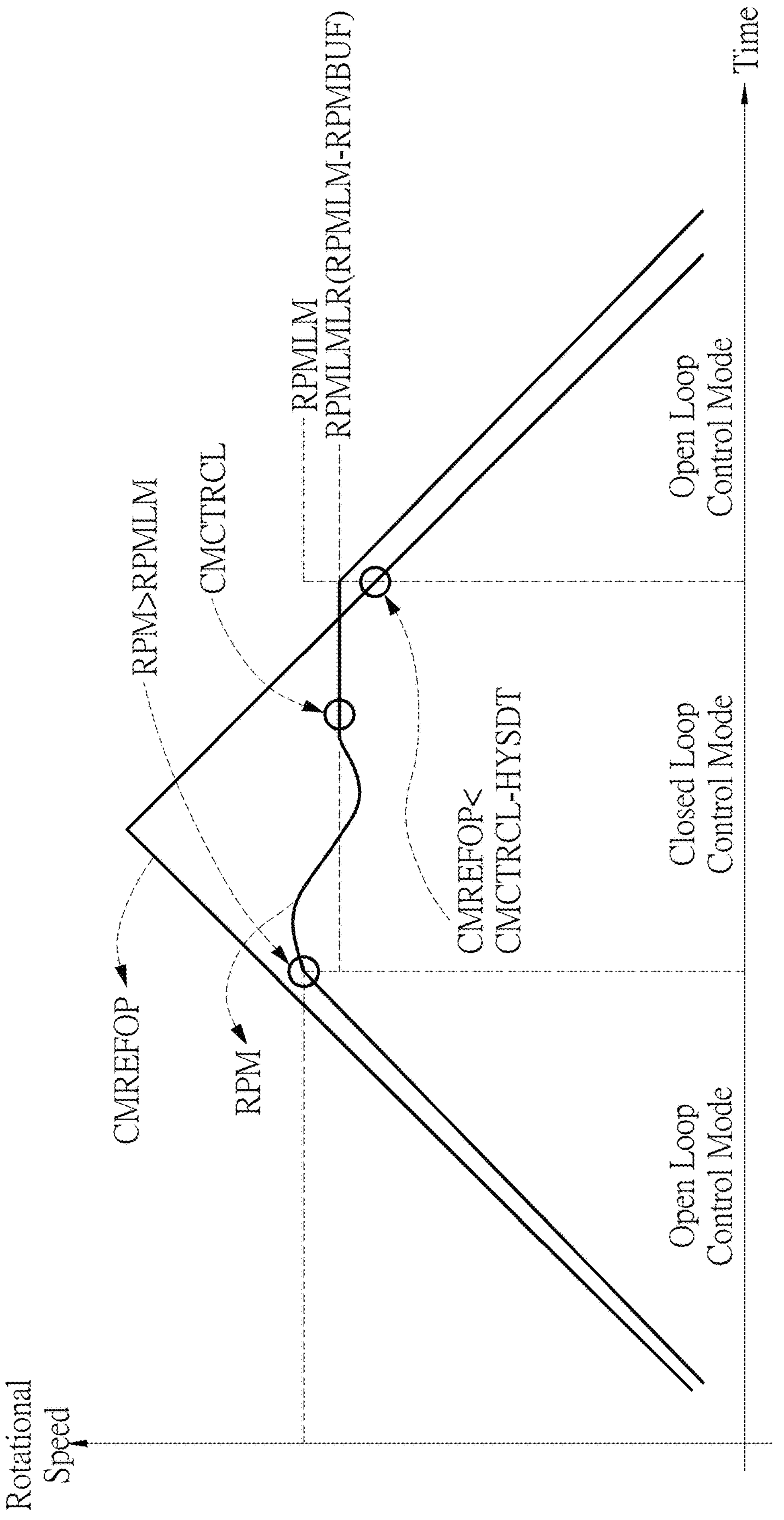
FIG. 10 is a schematic diagram of commands and a limit value of the motor rotational speed limit circuit according to the eighth embodiment of the present disclosure.

Reference is made to FIG. 9 and FIG. 10, in which FIG. 9 is a flowchart diagram of steps performed by a motor rotational speed limit circuit according to an eighth embodiment of the present disclosure, and FIG. 10 is a schematic diagram of commands and a limit value of the motor rotational speed limit circuit according to the eighth embodiment of the present disclosure.

The descriptions of the eighth embodiment of the present disclosure that are the same as that of the sixth embodiment of the present disclosure are not repeated herein.

A difference between the eighth embodiment as shown in FIG. 9 and the sixth embodiment as shown in FIG. 6 is that, step S107 as shown in FIG. 6 is replaced with step S401 as shown in FIG. 9.

In step S401, the driver circuit DRV as shown in FIG. 1 or the multiplexer MUX as shown in FIG. 2 determines whether or not the rotational speed RPM of the motor MT that is detected by the detector circuit DET in the closed loop control mode is lower than a rotational speed buffer limit value RPMLMLR. For example, as shown in FIG. 10, the rotational speed buffer limit value RPMLMLR is equal to the rotational speed limit value RPMLM from which a buffer rotational speed difference RPMBUF is subtracted.

If the rotational speed RPM of the motor MT that is detected by the detector circuit DET in the closed loop control mode is not lower than the rotational speed buffer limit value RPMLMLR, step S106 is performed such that the motor rotational speed limit circuit of the present disclosure still operates in the closed loop control mode as shown in FIG. 10.

Conversely, if the rotational speed RPM of the motor MT that is detected by the detector circuit DET in the closed loop control mode is lower than the rotational speed buffer limit value RPMLMLR, step S103 is then performed such that the motor rotational speed limit circuit of the present disclosure switches from the closed loop control mode to the open loop control mode as shown in FIG. 10.

As described above, in the eighth embodiment, the buffer rotational speed difference RPMBUF is subtracted from the rotational speed limit value RPMLM to obtain the rotational speed buffer limit value RPMLMLR as a rotational speed threshold. The rotational speed threshold is lower than the rotational speed limit value RPMLM. Therefore, when the rotational speed RPM of the motor MT is lower than the rotational speed threshold, the motor rotational speed limit circuit successfully switches from the closed loop control mode to the open loop control mode rather than floating between the closed loop control mode and the open loop control mode.

In conclusion, the present disclosure provides the motor rotational speed limit circuit. Under normal conditions, the open loop circuit included in the motor rotational speed limit circuit of the present disclosure is used to control the motor (of a fan). However, when the rotational speed of the motor detected by the detector circuit of the motor rotational speed limit circuit of the present disclosure exceeds the rotational speed limit value or the rotational speed threshold, the open loop circuit included in the motor rotational speed limit circuit of the present disclosure is used to control the motor for reducing the rotational speed of the motor. When the rotational speed of the motor is reduced to be lower than the rotational speed limit value or the rotational speed threshold, the closed loop circuit included in the motor rotational speed limit circuit of the present disclosure is used to control the motor in order to protect the motor (of the fan) and the motor rotational speed limit circuit of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor rotational speed limit circuit, comprising:

a controller circuit, including:

an open loop circuit configured to output an open loop rotational speed control command; and a closed loop circuit configured to output a closed loop rotational speed control command;

a detector circuit connected to a motor and configured to detect a rotational speed of the motor; and a selector circuit connected to the open loop circuit, the closed loop circuit and the detector circuit, wherein the selector circuit selects one of the open loop rotational speed control command of the open loop circuit and the closed loop rotational speed control command of the closed loop circuit according to the rotational speed of the motor that is detected by the detector circuit, and outputs the one of the open loop rotational speed control command and the closed loop rotational speed control command;

a driver circuit connected to the selector circuit and the motor, wherein the driver circuit, according to the one of the open loop rotational speed control command and the closed loop rotational speed control command, outputs a driving signal to the motor;

wherein, when the rotational speed of the motor exceeds a rotational speed limit value in an open loop control mode, the motor rotational speed limit circuit switches from the open loop control mode to a closed loop control mode;

wherein, in the closed loop control mode, the driver circuit outputs the driving signal to the motor according to the closed loop rotational speed control command for reducing the rotational speed of the motor.

2. The motor rotational speed limit circuit according to claim 1, wherein the selector circuit includes:

a multiplexer, wherein a first input terminal of the multiplexer is connected to an output terminal of the open loop circuit, a second input terminal of the multiplexer is connected to an output terminal of the closed loop circuit, a control terminal of the multiplexer is connected to an output terminal of the driver circuit, and an output terminal of the multiplexer is connected to an input terminal of the driver circuit.

3. The motor rotational speed limit circuit according to claim 1, wherein the closed loop circuit outputs the closed loop rotational speed control command according to a closed loop reference rotational command from an external instruction circuit.

4. The motor rotational speed limit circuit according to claim 1, wherein the open loop circuit outputs the open loop rotational speed control command according to an open loop reference rotational command from an external instruction circuit.

5. The motor rotational speed limit circuit according to claim 1, wherein, before the detector circuit detects the motor, the motor rotational speed limit circuit enters the open loop control mode and the driver circuit outputs the driving signal to the motor according to the open loop rotational speed control command in the open loop control mode.

6. The motor rotational speed limit circuit according to claim 1, wherein, when the rotational speed of the motor driven by the driver circuit in the closed loop control mode is lower than the rotational speed limit value, the motor rotational speed limit circuit switches from the closed loop control mode to the open loop control mode.

7. The motor rotational speed limit circuit according to claim 1, wherein, in the closed loop control mode, the detector circuit detects the closed loop rotational speed control command outputted by the closed loop circuit, and the detector circuit detects an open loop reference rotational command that is received from an external instruction circuit by the open loop circuit.

8. The motor rotational speed limit circuit according to claim 7, wherein, when a duty cycle of the open loop reference rotational command is smaller than a duty cycle of the closed loop rotational speed control command in the closed loop control mode, the motor rotational speed limit circuit switches from the closed loop control mode to the open loop control mode.

9. The motor rotational speed limit circuit according to claim 7, wherein, when a duty cycle of the open loop reference rotational command is smaller than a duty cycle of the closed loop rotational speed control command from which a hysteresis duty cycle is subtracted in the closed loop control mode, the motor rotational speed limit circuit switches from the closed loop control mode to the open loop control mode.

10. The motor rotational speed limit circuit according to claim 7, wherein, when the rotational speed of the motor is lower than the rotational speed limit value and a duty cycle of the open loop reference rotational command is smaller than a duty cycle of the closed loop rotational speed control command in the closed loop control mode, the motor rotational speed limit circuit switches from the closed loop control mode to the open loop control mode.

11. The motor rotational speed limit circuit according to claim 7, wherein, when the rotational speed of the motor is lower than the rotational speed limit value and a duty cycle of the open loop reference rotational command is smaller than a duty cycle of the closed loop rotational speed control command from which a hysteresis duty cycle is subtracted in the closed loop control mode, the motor rotational speed limit circuit switches from the closed loop control mode to the open loop control mode.

12. The motor rotational speed limit circuit according to claim 7, wherein, when the rotational speed of the motor is lower than a rotational speed buffer limit value and a duty cycle of the open loop reference rotational command is smaller than a duty cycle of the closed loop rotational speed control command from which a hysteresis duty cycle is subtracted in the closed loop control mode, the motor rotational speed limit circuit switches from the closed loop control mode to the open loop control mode.

13. The motor rotational speed limit circuit according to claim 12, wherein the rotational speed buffer limit value is equal to the rotational speed limit value from which a buffer rotational speed difference is subtracted.

14. The motor rotational speed limit circuit according to claim 7, wherein, in the open loop control mode, the open loop circuit outputs the open loop rotational speed control command according to the open loop rotational speed control command from the external instruction circuit.

* * * * *